June 12, 1934.    F. E. LEWIS    1,962,355
MOTOR CONTROL SYSTEM
Filed March 25, 1931    2 Sheets-Sheet 1

Fig. 1.

WITNESSES:

INVENTOR
Frank E. Lewis.
BY
Wesley G. Carr
ATTORNEY

June 12, 1934.   F. E. LEWIS   1,962,355
MOTOR CONTROL SYSTEM
Filed March 25, 1931   2 Sheets-Sheet 2

WITNESSES:
Arthur J. McMahon
C. H. Winkler

INVENTOR
Frank E. Lewis.
BY
Wesley G. Carr
ATTORNEY

Patented June 12, 1934

1,962,355

UNITED STATES PATENT OFFICE 1,962,355

MOTOR CONTROL SYSTEM

Frank E. Lewis, Chicago, Ill., assignor to Westinghouse Electric & Manufacturing Company, a corporation of Pennsylvania Application March 25, 1931, Serial No. 525,075

15 Claims. (Cl. 172—152)

My invention relates to motor-control systems and particularly to control systems for elevators, hoists and similar machinery in which great accuracy is required in controlling the speeds of the motors in the low-speed range.

More particularly, my invention relates to a variable-voltage control system in which the speed of a motor is controlled by varying the voltage supplied to it by a plurality of generators arranged for connection in series relation and in which a low motor speed is obtained by excluding all but one of the generators from the motor circuit.

In heavy-duty elevator systems employing the variable-voltage drive, difficulty is experienced in operating the cars at landing speeds because of limitations in the design of motors and generators. That is to say, at low motor speeds, the generator voltage is so low that the resistance drops in the armatures of the machines and in the conductors connecting them may be a considerable percentage of the generator voltage; and the generator field flux may be so low that the residual flux may be a considerable part of the total field flux.

In a copending application of Henry D. James and Harold W. Williams, Serial No. 414,684, filed December 17, 1929, issued August 13, 1932, as Patent No. 1,871,698 and assigned to the Westinghouse Electric and Manufacturing Company, a system of variable-voltage control is disclosed in which the effects of regulation and residual magnetism are reduced by providing a plurality of generators so arranged that all are effective, in series relation, to supply high voltage to the motor for operation at high speed, whereas operation of the motor at landing speeds is effected by removing the excitation from all but one of the generators.

In accordance with this arrangement, the low voltage obtained for landing speeds is a higher percentage of the full voltage of a generator than would be the case if only a single generator were employed to supply all of the energy for both low-speed and high-speed operation. In the practice of this system, it is possible to obtain a lower landing speed than would be practicable if a single large generator were employed and also to attain better regulation at the landing speed.

The above described arrangement also considerably improves the operation of systems embodying automatic leveling mechanisms. In systems embodying this feature, if the initial stoppage of an elevator car is inaccurate, or if, after having been brought to rest accurately level with a floor landing, the elevator car thereafter "drifts" to a position slightly above or below the floor, circuits are completed to cause the car to move, at slow speed, to a position accurately level with the floor landing.

If an elevator car is brought to rest at a floor landing after upward movement thereof, and an additional leveling movement in the upward direction thereafter becomes necessary, the voltage available to effect the leveling movement is proportional to the sum of the residual magnetism of the supply generator plus the magnetomotive force derived from the field circuit of the generator. If, however, a leveling movement in the opposite direction becomes necessary, the voltage available to effect the leveling movement is proportional to the difference between the residual magnetism of the supply generator and the magnetomotive force derived from the field circuit of the generator.

In the absence of accurate voltage control, the location of the leveling switches, with respect to a floor landing, is necessarily a matter of compromise, since operation of such switches to effect a leveling movement in the original direction of approach results in a greater amount of car movement than results from an operation of the leveling switches to cause a leveling movement in the opposite direction.

As described, however, if the energy for leveling purposes is derived from a relatively low-voltage generator, the low voltage obtained for the leveling movement may be a relatively high percentage of the full voltage of that machine, and the effects of residual magnetism are minimized. Accordingly, the voltage available to effect a leveling movement in the original direction of approach may be very nearly equal to the voltage available to effect a leveling movement in the opposite direction. With such arrangement, the leveling switches may be so located as to maintain the car more accurately level with the floor, since substantially the same amount of car movement results from the operation of the leveling switches to cause a leveling movement in the original direction of approach as from an operation thereof to cause a leveling movement in the opposite direction.

The present invention constitutes an improvement upon the system disclosed in the Williams et al. application, identified above, in that in accordance with one modification, the system is so arranged that, to effect the low operating speed of the motor, from which stopping is done, all but one of the generators may be excluded from the motor circuit. In accordance with a second modification, to effect the low "landing" speed of the hoisting motor, from which stopping is done, the excitation is removed from all but one of the generators in the manner described in the above-identified Eames et al. application. In accordance with this modification, however, when the car is brought to rest, the armatures of all but one of the generators are excluded from the motor circuit, and, if a leveling movement becomes necessary, the motor armature is connected in a local circuit with the armature of only one of the generators.

In the illustrated embodiment of my invention, in which only two generators are employed, the transition from double to single-generator operation is effected by, first, short circuiting the generator which is to be excluded, and, second, interrupting the armature circuit of that generator. The transition from single to double-generator operation is effected by, first, completing the armature circuit of the generator to be included and, second, interrupting the shunt circuit around that generator. In accordance with this alternative arrangement the armature circuit of the motor is maintained complete throughout both transfer operations.

As will hereinafter more fully appear, there is an interval during the transition throughout which the switching mechanism which controls the shunt circuit, and the switching mechanism which controls the armature circuit of the second generator are both closed. During this interval, in the practice of the first named modification, a local circuit of relatively low resistance is subjected to the voltage of the second generator. In order that the current in this local circuit may be maintained within proper limits, the system is so arranged that the transfer operation does not occur unless the voltage of the second generator is below a predetermined low value. In the illustrated embodiment, this result is attained by arranging the transfer mechanism for control in accordance with an electrical condition of the generator which is proportional to the voltage thereof, and by providing means to interrupt the field circuit of the second generator prior to the actuation of the transfer mechanism.

It is, accordingly, an object of my invention to provide a variable-voltage system of control in which a motor may be supplied with power by a plurality of generators arranged for connection in series to effect high-speed operation of the motor, and in which all but one of said generators may be excluded from the motor circuit to effect low-speed operation of the motor.

A further object of my invention is to provide a variable-voltage system of control for a motor embodying transfer mechanism by means of which one or more of a plurality of generators may be selectively included and excluded in and from the motor circuit, to effect different operating speeds of the motor, and in which the transfer mechanism may be controlled in accordance with the voltage of said generator or generators.

Other and more specific objects of the invention will appear in the following description and appended claims.

A practical embodiment of my invention is described in detail in the following specification and illustrated in the accompanying drawings, in which.

Figure 1:
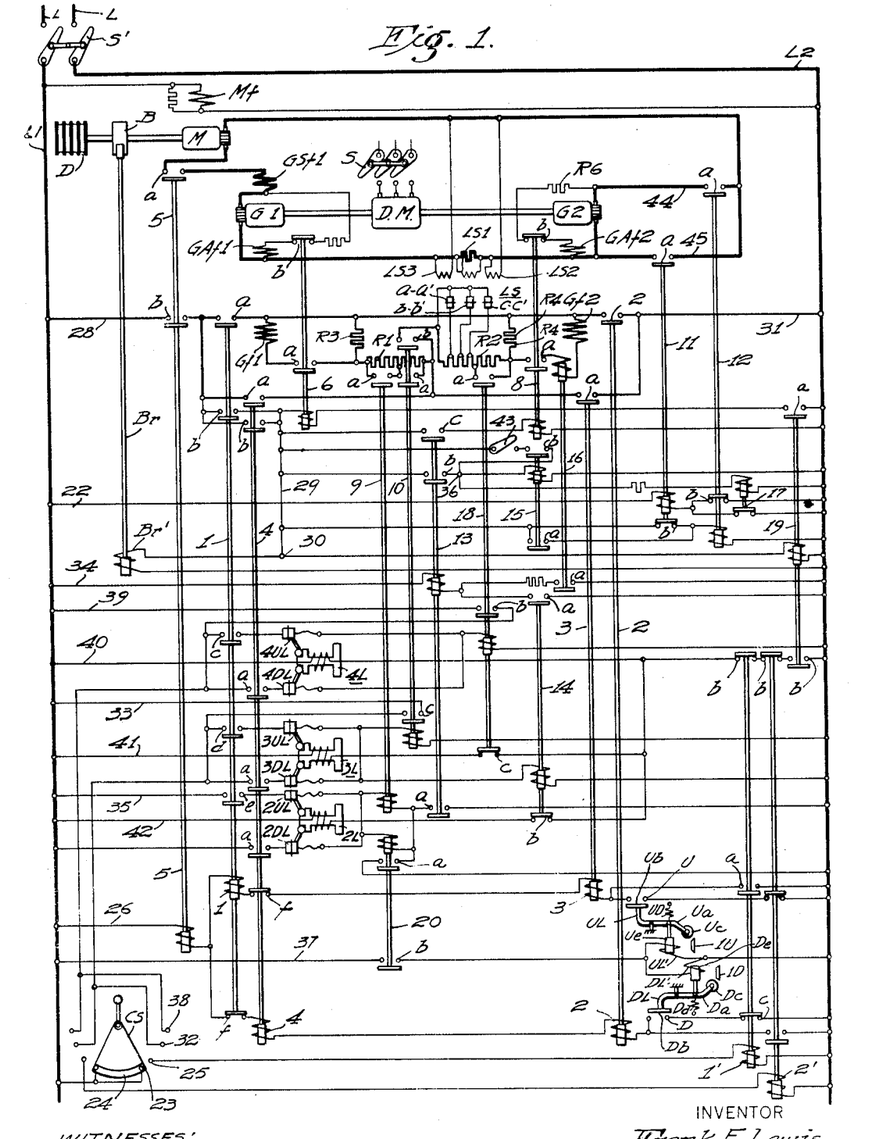
Figure 1 is a schematic diagram of an elevator system embodying my invention.

The system of control shown in Fig. 1 is of the type wherein the starting of the car and the acceleration thereof are controlled in accordance with the position of a manually-operable control switch on the elevator car, and in which the retardation and the stopping of the car are controlled by means of automatic switch mechanisms operable in accordance with the position of the elevator car with respect to a selected floor landing.

Referring to Fig. 1, an elevator motor M is connected with its armature in a local circuit with the armature of a relatively high-voltage generator G2 and the armature of a relatively low-voltage generator G1. The field winding MF of motor M is connected, for constant excitation, across line conductors L1 and L2.

Figures 2, 3, 4:
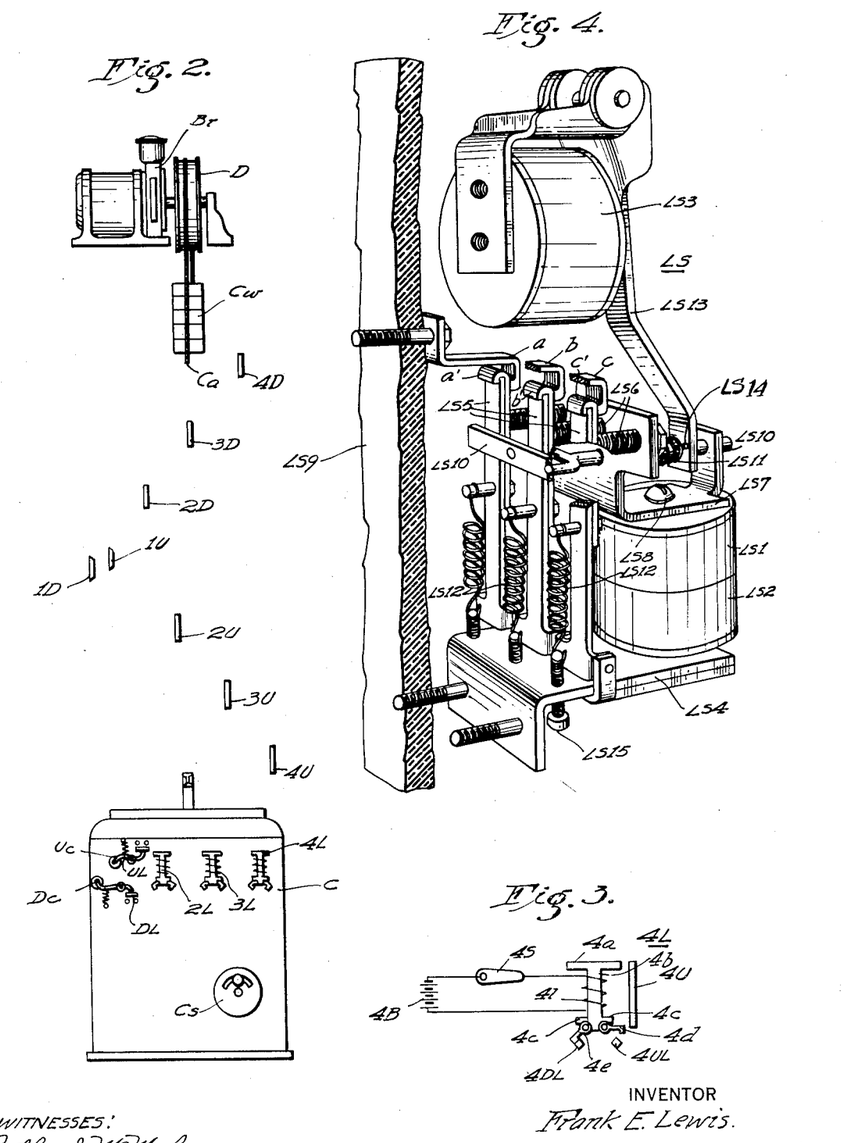
Fig. 2 is a diagrammatic view showing the relation of the elements of the hatchway switches employed in the system shown in Fig. 1.
Fig. 3 is a diagrammatic view illustrating the operation of one of the hatchway switches.
Fig. 4 is a diagrammatic view of a current-responsive switch employed, in the system shown in Fig. 1, to compensate for the effect of varying loads on the elevator car during high-speed operation thereof.

The armature of motor M is mounted on a common shaft with a brake drum B and a hoisting drum D. As shown in Fig. 2, an elevator car C is suspended by means of a cable Ca which passes, over the drum D, to a suitable counterweight Cw.

Returning to Fig. 1, the low-voltage generator G1 is provided with a series field winding GS/1, a separately excited field winding G/1 and a demagnetizing winding GA/1. The generator G2 is provided with a separately excited field winding G/2 and with a demagnetizing winding GA/2.

The circuits of the windings G/1 and G/2 include, respectively, the series resistors R1 and R2, portions of which may be selectively controlled to provide different operating speeds of the motor M. Discharge resistors R3 and R4, connected in parallel, respectively, with the windings G/1 and G/2, are employed to control the rates of change of current in the windings during the retarding and accelerating operations.

The series field winding GS/1, associated with generator G1, functions, in a well known manner, to increase the voltage of that machine when the motor receives power from the generator circuit and to decrease the voltage of that machine when the motor M returns power to the generator circuit, by an amount sufficient to render the operating speed of motor M substantially independent of variations in the magnitude or character of the load current.

In practice, the series field winding GS/1 may be designed to provide satisfactory regulation throughout the greater part of the speed range of motor M. At the higher speeds, however, because of a variety of effects, including magnetic saturation of the generator field structure, the effect of the series field winding becomes inadequate to prevent minor variations of motor speed. Accordingly, in the illustrated embodiment of my invention, I employ an additional compounding means comprising a current-responsive switch LS, of a type disclosed in a copending application of William F. Eames, Serial No. 236,772, filed November 30, 1927, issued July 18, 1933, Patent No. 1,919,014, and assigned to the Westinghouse Electric & Manufacturing Company. As described in that application, the switch LS is arranged to become effective, at a predetermined value of generator voltage, to increase or decrease the voltage of generator G2 in accordance with the value and direction of current exchanged between the motor M and the generators G1 and G2.

Referring to Fig. 4, the current-responsive switch LS comprises a calibrating coil LS1, a biasing coil LS2, and a release coil LS3. As shown schematically in Fig. 1, the calibrating coil LS1 is connected in the motor-armature circuit in parallel with a low-resistance shunt and is excited in accordance with the value of the current in that circuit. Coils LS2 and LS3 are connected across the terminals of the motor M and are excited in accordance with the voltage of that circuit. Coils LS1 and LS2 are wound to act cumulatively if the load is positive and in opposition if the load is regenerative.

Returning to Fig. 4, the magnetic circuit provided for the flux of the coils LS1 and LS2, which are wound on the same core, comprises the base plate LS4, a plurality of contact fingers LS5, a plurality of short elements LS6, a top plate LS7 and the core LS8.

A group of stationary contact members a, b and c are mounted on the panel LS9 to cooperate with a corresponding group of movable contact members a', b' and c', one of which is carried at the upper end of each of the contact fingers LS5. Each of the contact fingers LS5 is pivotally mounted, at the lower end thereof, on the base plate LS4.

The contact members a—a', b—b' and c—c' are normally biased to the illustrated and closed position by means of a locking bar LS10 and a spring LS11. One end of the spring LS11 bears against the top plate LS7 and the other end thereof bears against a lug LS14, mounted on the shaft of the locking bar LS10.

The biasing springs LS12, one of which is associated with each of the contact fingers LS5, are connected, at one end, to the respective contact fingers, and, at the other end, to the base plate LS4, and tend to move the associated contact members a', b' and c' to the open-circuit position. The springs LS12 are calibrated by means of adjusting screws LS15, to exert different biasing forces on the individual contact fingers LS5.

The release coil LS3 is mounted directly upon the panel LS9 and is provided with a pivotally mounted armature LS13, one end of which bears against lug LS14 on the locking bar LS10. Armature LS13 is biased to the illustrated position by the spring LS11.

The operation of switch LS is as follows: Upon completion of the motor-armature circuit to cause movement of the elevator car C in either direction, a magnetomotive force, equal in value to the algebraic sum of the magnetomotive forces of the coils LS1 and LS2, is impressed upon the magnetic circuit, including the contact fingers LS5. Accordingly, a flux is established in this circuit tending to maintain the contact fingers in the position illustrated. Similarly, release coil LS3 impresses a magnetomotive force on the armature LS13 tending to rotate it in the clockwise direction and thereby force locking bar LS10 out of engagement with the contact fingers LS5.

As described, the corrective effect of switch LS is necessary only during high-speed operation of motor M. Accordingly, until the voltage across the motor-armature circuit has attained a predetermined value, equal, for example, to approximately two thirds of the full voltage of the system, the force of biasing spring LS11 exceeds the force of release coil LS3, and locking bar LS10 maintains the contact fingers in the illustrated position. It will be seen, therefore, that until the operating voltage of coil LS3 is reached, the positions of the contact fingers are independent of the magnetomotive forces developed by the coils LS1 and LS2.

When the voltage across coil LS3 reaches the predetermined value, armature LS13 is actuated to force the locking bar LS10 to the left, to a position out of engagement with the contact fingers LS5. Thereafter, the positions of the several fingers LS5 are determined in accordance with the relative values of the forces exerted thereon by the respective springs LS12 and the force transmitted through the magnetic circuit including the fingers.

In accordance with a preferred arrangement, the predetermined operating voltage of release coil LS3 is reached at substantially that stage of the accelerating operation at which the motor-armature current is of the "accelerating peak" or maximum value. Accordingly, following the operation of release coil LS3, the magnetomotive force impressed on the magnetic circuit, including the contact fingers, gradually decreases to a constant value determined by the load; the constant value being reached at the expiration of the accelerating operation and when the motor terminal voltage is at a maximum.

If the load current is of a maximum and positive value, the combined magnetomotive forces of coils LS1 and LS2 are sufficient, after constant or "steady-state" conditions obtain, to overcome the forces of all of the biasing springs LS12, and, consequently, all of the contact fingers remain in circuit-closing position. If the load is less than a certain percentage of the maximum value, the magnetizing forces of coils LS1 and LS2 are overcome by the biasing force of the spring LS12 associated with one of the fingers, and the contact members controlled thereby, a—a' for example, are opened. Referring to Fig. 1, the opening of contact members a—a' inserts a portion of the resistor R2 into the circuit of the field winding Gf2, thereby reducing the voltage of generator G2.

If the load is balanced, as when the weight of the counterweights and supporting cables equals the weight of the elevator car, passengers and supporting cables, the magnetomotive force of the current coil LS1 is substantially zero, and the contact fingers are subjected to the force of only the voltage coil LS2. Accordingly, an additional finger is released, under the influence of the biasing spring thereof, and the associated contact members, for example, b—b', are opened, to thereby further reduce the excitation of generator G2.

If the load is regenerative, as when the motor returns power to the system, the contact fingers LS5 are subjected to a magnetizing force equal to the difference of the individual forces of coils LS1 and LS2. If the regenerative current is of a sufficient value, the flux in the circuit including the contact fingers is of a very low value, and the third contact finger is released, under the influence of the biasing spring thereof. Accordingly, the third set of contact members, c—c', is opened to further reduce the excitation of generator G2.

In order that the flux in the circuit including the contact fingers may be maintained in the same direction, regardless of load conditions, coil LS2 is designed to develop a magnetomotive force in excess of the maximum magnetomotive force developed by the coil LS1.

In Figs. 1 and 4, the current-responsive switch LS is illustrated as comprising three contact fingers. It will be obvious that the number of fingers may be varied within any desired limits, depending upon the requirements of the particular system, the calibrating springs associated with each finger being designed to cause the release of the associated finger at a particular value of load current.

It is seen, therefore, that, when the system is operating at full voltage, the number of fingers in the open or in the closed position is determined in accordance with the value of the motor-armature current, and, in accordance with the nature of the load, more of the fingers will be closed for any one value of current if power is being supplied to the motor from the system than if power is being returned from the motor to the system. As described in the Eames application, identified above, the switch L5 is arranged to control a sufficient amount of the resistor R2 to supplement the action of the series field winding GSf1, associated with generator G1, and thereby render the operating speed of motor M independent of load conditions.

The generators G1 and G2 are arranged to be driven at a constant speed and are shown as directly connected to a driving motor DM, which may be of any suitable type.

The functions of the several switching mechanisms shown in Fig. 1 may briefly be described as follows:

Switches 1, 2, 3 and 4 and relays 1' and 2' are provided to control the reversing connections for the separately excited field windings Gf1 and Gf2 of generators G1 and G2. Switches 1 and 3 are arranged to operate simultaneously in response to closure of relay 1' to permit connection of these field windings across line conductors L1 and L2 to effect movement of car C in the upward direction, and switches 2 and 4 are arranged to operate simultaneously in response to closure of relay 2' to control the same circuits to effect movement of car C in the downward direction. As will be hereinafter more fully described, switches 1 and 4 and relays 1' and 2' also control a plurality of interlocks.

Switch 5 is provided to connect motor M in the circuit including generators G1 and G2, and to prepare a plurality of circuits including the reversing circuits.

Auxiliary field switch 6 controls the circuits of field windings Gf1 and GAf1, and switch 8 effects a corresponding control of the circuits of windings Gf2 and GAf2.

Switches 9 and 10 control sections of an accelerating resistor R1 in series with the field winding Gf1. Switch 10 also controls contact members in the circuit of field windings Gf2.

Transfer switches 11 and 12, transfer relays 13 14, 15 and 17 and the holding relay 16 control the inclusion and exclusion of generator G2 in and from the circuit of motor M. Transfer relays 13 and 14 and holding relay 16 also control the circuit for field switch 8.

While I may use any of a plurality of well known switching devices to commutate the circuits of the system during retardation, I prefer to use the inductor relays 4L, 3L and 2L to interrupt the accelerating circuits, and the mechanical switches UL and DL to interrupt the reversing circuits, to bring the elevator car from full speed to rest accurately level with a selected floor landing. In the illustrated embodiment of my invention, switches UL and DL function to maintain the car accurately level with the floor landing, in addition to controlling the initial stopping thereof.

The inductor relays may be of any type but are preferably of the type disclosed in the copending application of Harold W. Williams, Serial No. 279,771, filed May 22, 1928, issued March 21, 1933, as Patent No. 1,902,602 and assigned to the Westinghouse Electric and Manufacturing Company, the construction and operation of which may best be understood by reference to Fig. 3, in which one is diagrammatically shown.

Referring to Fig. 3, the relay 4L comprises a magnetic structure 4a having a central core portion 4b and a pair of small lugs 4c. A pair of armatures 4d and 4e of magnetic material are pivoted to the magnetic structure 4a. Each of the armatures 4d and 4e carries a movable contact member of a set of contact members 4UL and 4DL, respectively. Each of the armatures 4d and 4e is so mounted that, when it is in one position, the corresponding set of contact members 4UL or 4DL is closed, whereas, when the armature is in a second position, the corresponding set of contact members 4UL or 4DL is open, and the armature engages the corresponding lug 4c. The armatures 4d and 4e are biased, by any suitable means, to a position in which the sets of contact members 4UL and 4DL are closed. A winding 41 is mounted on the core portion 4b of the magnetic structure 4a. The magnetic structure 4a and the armatures 4d and 4e constitute a divided magnetic circuit, both branches of which are normally incomplete because of large air gaps between the upper portion of the magnetic structure and the relay armature.

The operation of such relay is as follows: As long as the winding 41 is deenergized, the armatures 4d and 4e remain in their biased positions, with the contact members 4UL and 4DL closed. Upon energization of the winding 41, as by closure of a switch 4S, connecting the winding to a suitable source 4B, a magnetomotive force is impressed on the relay magnetic circuit. Because of the large air gaps, the flux set up in the relay magnetic circuit is insufficient to cause movement of the armatures. If a branch of the magnetic circuit is now completed, as by movement of the relay into a position adjacent to an inductor plate 4U, the corresponding armature 4d moves, against its bias, into a position to engage the corresponding lug 4c, opening the corresponding set of contact members 4UL. If the relay now moves beyond the inductor plate 4U, the contact members 4UL remain open, as the armature 4d, is held against its bias because of the magnetic sticking action of lug 4c. If, while the coil 41 is still energized, the second branch of the magnetic circuit is completed by movement of the relay 4L adjacent to a second inductor plate, the contact members 4DL are opened, remaining open after the relay moves past the second inductor plate because of the action of lugs 4c. If the winding 41 is now deenergized, by opening the switch 4S, the armatures 4e and 4d are released from the lugs 4c to return to their biased positions, closing the contact members 4UL and 4DL. If the relay 4L, while the winding 41 is deenergized, moves adjacent to other inductor plates, the armatures 4e and 4d are not affected, and the contact members 4UL and 4DL remain closed. The contact members 4UL or 4DL are, therefore, opened only when the relay arrives at a position adjacent to an inductor plate while the relay winding is energized; and, when opened, remain open, regardless of the position of the relay with respect to inductor plates, until the coil of the relay is deenergized. As will be apparent, relays 3L and 2L are duplicates of relay 4L.

Returning to Fig. 2, a set of inductor plates 4U, 3U, 2U, 2D, 3D and 4D, is mounted in the hatchway in cooperative relation to the inductor relays carried by the car C. While I have illustrated only one complete set of inductor plates, it will be understood that one complete set is provided for each floor, except the top and bottom floors. A set, corresponding to inductor plates 2U, 3U and 4U, is provided for the top floor, and a set, corresponding to inductor plates 2D, 3D and 4D, is provided for the bottom floor.

The switches UL and DL each comprise a single pair of normally open contact members and are of a type which may be actuated to close the associated contact members either by bringing a roller, carried at the end of an operating arm, into engagement with a cooperating mechanical cam, or by energizing the coil of an electromagnetic retiring mechanism.

Referring to Fig. 1, the switch UL comprises a pivotally mounted operating arm $Ua$, provided at one end with a contact-bridging segment $Ub$, and provided, at the other end, with a roller $Uc$. The arm $Ua$ is biased to the illustrated position by means of a spring $Ud$. Switch DL comprises corresponding elements.

Referring to Fig. 2, switches UL and DL are mounted upon the elevator car C in such position that the rollers $Uc$ and $Dc$ extend, respectively, into the paths of mechanical cams 1U and 1D, which are mounted in the elevator hatchway, and one of each of which is provided for each floor of the building. The position of each pair of cams, with respect to the associated floor, is such that, when the elevator car is substantially level therewith, the rollers $Uc$ and $Dc$ are out of engagement with the raised surfaces of the respective cams.

Returning to Fig. 1, the retiring mechanism for switch UL comprises a core $Ue$, of magnetic material, pivotally connected to the operating arm $Ua$, and provided with an actuating coil $UL'$. When the coil $UL'$ is energized, the core $Ue$ is drawn downwardly therein and thereby rotates the arm $Ua$ in a clockwise direction sufficiently to cause the segment $Ub$ to bridge the contact members U and to withdraw the roller $Uc$ from the path of the cooperating mechanical cams. The retiring mechanism of switch DL is similarly organized.

The operation of switches UL and DL is as follows: While any of the accelerating circuits of the system are complete, both retiring coils $UL'$ and $DL'$ are energized. Accordingly, the rollers $Uc$ and $Dc$ are withdrawn from the paths of the associated cams, and the contact members U and D are bridged by the cooperating segments. As the elevator car C approaches a floor at which a stop is to be made, the retiring coils $UL'$ and $DL'$ are deenergized at an appropriate stage of the retarding operation. If the elevator car C is moving upwardly, the deenergization of the coils $UL'$ and $DL'$ occurs when the roller $Uc$ is opposite the raised surface of the cam 1U associated with the selected floor landing. Accordingly, the arm $Ua$ is maintained in the circuit-closing position through the cooperation of roller $Uc$ and cam 1U. Since roller $Dc$ is not opposite a cooperating cam, arm $Da$ is rotated, under the influence of biasing spring $Dd$, to the position illustrated in Fig. 1, and the segment $Db$ is moved out of engagement with the contact members D. Since the car is moving upwardly, however, the opening of switch DL is without effect.

When the elevator car C reaches a position substantially level with the selected floor landing, the roller $Uc$ moves out of engagement with the cam 1U, thereby permitting the arm $Ua$ to resume its normal position and interrupt the circuit through the contact members U. As will hereinafter more fully appear, the interruption of this circuit causes the car to stop. As will be apparent, if the car approaches a floor landing in the downward direction, the reverse operation occurs, switch UL being permitted to open without effect, and switch DL being maintained in the circuit-closing position, through cooperation of roller $Dc$ and cam 1D, until the elevator car reaches a position substantially level with the floor.

Relay 19 controls the energizing circuits for the coils of all of the inductor relays, and relay 20 controls the energizing circuit for the retiring coils $UL'$ and $DL'$ of stopping switches UL and DL. Throw-over switch 43 is arranged to permit operation in accordance with either the first or the second modification. When switch 43 occupies the illustrated position, the system operates in accordance with the first described modification.

In the illustrated embodiment, all of the foregoing switching mechanisms may be controlled from the elevator car C by means of a manually operable car switch $Cs$.

The operation of the above described apparatus, in accordance with the first described modification, may best be described in connection with an assumed accelerating, running and retarding cycle of the elevator car C. For the purpose of this description, the accelerating sequence may be considered as comprising three steps, as follows:

1. Completion of reversing circuits to thereby apply minimum excitation to one generator, connection of that generator to the hoisting motor armature, and the release of the brake.

2. (a) Increasing the excitation of said one generator to a maximum, and (b) Application of excitation to the second generator and the inclusion of that generator in hoisting motor circuit.

3. Increasing the excitation of the second generator to a maximum.

The retarding sequence may be considered as comprising the following four steps:

1. Reduction of the excitation of the second generator to an intermediate value.

2. (a) Reduction of the excitation of the first generator to an intermediate value, and (b) Removal of the excitation from the second generator and exclusion of that generator from the hoisting motor circuit.

3. Reduction of the excitation of the first generator to a minimum.

4. Interruption of the reversing circuits to thereby bring the system to rest.

Preliminary to the operation of elevator car C, switch S may be closed to start driving motor DM, to bring generators G1 and G2 up to speed, and switch S' may be closed to connect line conductors L1 and L2 to the direct-current source L.

Upon closure of switch S', field $Mf$ of motor M builds up to full value. The energization of this winding, however, is without immediate effect, since the motor terminal voltage is zero. Closure of switch S' also completes a circuit for the actuating coil of transfer switch 11, which circuit extends from line conductor L1, through conductor 22, the coil of switch 11, and thence, in parallel, through the normally closed contact members b of switch 12 and the normally closed contact members of relay 17, to line conductor L2.

Upon actuation of switch 11, the contact members a thereof are closed, and the contact members b thereof are opened. Closure of the contact members a of switch 11 completes a shunt circuit around the armature of generator G2. The opening of contact members b is without immediate effect.

The operation of elevator car C may now be initiated by movement of car switch Cs. Assuming that it is desired to move the elevator car upwardly, the operator may move car switch Cs in a counter-clockwise direction to the first operating position, to thereby effect the inter-connection of the armatures of motor M and generator G1; the completion of the field circuits of generator G1; and the release of the electromagnetic brake Br. The circuits involved are as follows: Closure of car-switch contact members 23, 24 and 25 completes a circuit for the actuating coil of up-direction starting relay 1'. This circuit extends from line conductor L1, through the contact members 23, 24 and 25 of car switch Cs and the coil of relay 1', to line conductor L2.

Upon actuation of relay 1', the contact members a thereof are closed, and the contact members b and c thereof are opened. Closure of the contact members a of relay 1' completes an energizing circuit for the actuating coils of switch 5 and up-direction reversing switches 1 and 3, which circuit extends from line conductor L1, through conductor 26, the coils of switches 5, 1 and 3 in series and contact members a of relay 1', to line conductor L2.

The opening of contact members b of relay 1' interrupts the energizing circuits for the coils of inductor relays 4L, 3L and 2L, thereby rendering these devices ineffective as long as car switch Cs occupies a position other than the neutral position. The opening of contact members c of starting relay 1' renders the stopping switch DL ineffective.

Upon actuation of switch 5, the contact members a and b thereof are closed. Closure of contact members a of switch 5 connects the armature of motor M in a series circuit including the armature of generator G1, the winding GSf1, and contact members a of switches 5 and 11. Closure of contact members b of switch 5 prepares the reversing, brake and certain auxiliary, control circuits.

Upon actuation of switch 1, the contact members a, b, c, d and e thereof are closed, and the contact members f thereof are opened. Upon actuation of switch 3, the contact members a thereof are closed.

Closure of contact members a of switches 1 and 3 prepares circuits to connect field windings Gf1 and Gf2 across line conductors L1 and L2 with the proper polarity to cause upward travel of the elevator car C. The circuits for these windings will be traced in detail in later paragraphs.

Closure of contact members b of switch 1 completes the circuits for the actuating coil of control relay 19 and release coil Br' of the electromagnetic brake Br. These circuits extend from line conductor L1, through conductor 28, the contact members b of switches 5 and 1, conductor 29, to a junction point 30 and thence, in parallel through the coil Br' and the coil of relay 19, to line conductor L2.

Closure of the contact members b of switch 1 also prepares the circuits for the actuating coils of field switch 6, associated with generator G1, field switch 8 associated with generator G2, relays 15 and 17 and transfer switch 12.

Closure of contact members c, d and e of switch 1 prepares the accelerating circuits, hereinafter more fully described.

The opening of contact members f of switch 1 interrupts the energizing circuit for down-direction reversing switches 2 and 4.

Upon energization of the actuating coil thereof, the contact members a and b of relay 19 are closed. Closure of contact members a of relay 19 completes the circuit for the actuating coil of field switch 6, which circuit extends from line conductor L1, through conductor 28, the contact members b of switches 5 and 1, the coil of switch 6 and thence to line conductor L2 through the contact members a of relay 19.

The contact members b of relay 19 are included in the circuit of the coils of inductor relays 4L, 3L and 2L to prevent energization thereof while the car is at rest. Since these circuits are now interrupted at the contact members b of up direction starting relay 1', the closure of contact members b of relay 19 is without immediate effect.

Upon completion of the energizing circuit for release coil Br', the electromagnetic brake Br is released from the brake drum B.

Upon actuation of switch 6, the contact members a thereof are closed and the contact members b thereof are opened. The opening of the contact members b of switch 6 interrupts the circuits of demagnetizing winding GAf1. The function of this winding will be explained in the course of the description of the retarding operation.

Closure of contact members a of field switch 6 completes the exciting circuit for the field winding Gf1 of generator G1, which circuit extends from line conductor L1, through conductor 28, the contact members b of switch 5, contact members a of switch 1, the field winding Gf1, contact members a of switch 6, accelerating resistor R1, and thence to line conductor L2, through the contact members a of switch 3 and conductor 31. Upon completion of this circuit, the voltage of generator G1 rises to a predetermined low value, and motor M starts elevator car C upwardly at a low landing speed.

In Fig. 1, the circuits for the field winding Gf1 and the brake-release coil Br' are shown as arranged for substantially simultaneous completion. It will be understood that, in practice, the brake Br is not released until the voltage of generator G1 is sufficiently high to enable motor M to develop sufficient torque to control the position of the car C.

Accordingly, as a result of the completion of the above described circuits, motor M will continue to move elevator car C upwardly at a low landing speed as long as car switch Cs is maintained in the first operating position. As described hereinbefore, the series field winding GSf1 functions to increase the voltage of generator G1, if the load is positive, or to decrease the voltage of generator G1 if the load is regenerative, by an amount sufficient to maintain the speed of motor M at a predetermined value, regardless of such load conditions.

To cause elevator car C to travel at a higher speed, the operator may move car switch Cs in the counter clockwise direction to the second operating position thereof, to thereby cause the exclusion of a portion of the accelerating resistor R1 from the circuit of the field winding Gf1; cause the inclusion of the armature of generator G2 in the circuit of the armature of motor M; and cause completion of the energizing circuit for the field winding Gf2 of generator G2. The circuits involved in this sequence are as follows:

Closure of the contact members 23, 24 and 32 of car switch Cs completes the energizing circuits for the actuating coils of accelerating switch 10 and transfer relay 14. These circuits extend from line conductor Li through contact members 23, 24 and 32 of car switch Cs, the now closed contact members d of switch 1, the normally closed contact members 3UL of inductor relay 3L, and thence, in parallel, through the coils of switch 10 and relay 14 to line conductor L2.

Upon actuation of switch 10, the contact members a, b and c thereof, are closed. Closure of contact members a of switch 10 excludes a portion of resistor R1 from the circuit of the field winding Gf1, to thereby cause the voltage of generator G1 to increase to an intermediate value. The increase in voltage of generator G1 causes a proportionate increase in the speed of motor M, and of car C.

Closure of contact members b of switch 10 prepares the circuit for the field winding Gf2 of generator G2.

Closure of contact members c of switch 10 completes a holding circuit for the coils of switch 10 and relay 14, which circuit extends from line conductor L1, through conductor 33 and contact member c of switch 10, to line conductor L2, as previously traced. Accordingly, following completion of the above described holding circuit, the circuits for switch 10 and relay 14 are independent of the position of car switch Cs and remain complete until the opening of the contact members 3UL of inductor relay 3L, which occurs during the retarding operation.

Upon actuation of relay 14, the contact members a thereof are closed, and the contact members b thereof are opened. Closure of contact members a of relay 14 completes the circuit for the actuating coil of transfer relay 13, which circuit extends from line conductor L1, through conductor 34, the coil of transfer relay 13 and the contact members a of relay 14, to line conductor L2.

The contact members b of relay 14 control an interlock in the circuit of the coil of inductor relay 2L, and the opening thereof in the accelerating operation is without effect.

Upon actuation of transfer relay 13, the contact members a, b and c thereof are closed. Closure of contact members a of relay 13 completes the circuits for the actuating coils of accelerating switch 9 and control relay 20, which circuits extend from line conductor L1, through conductor 35, the now closed contact members e of switch 1, the normally closed contact members 2UL of inductor relay 2L, in parallel, through the coils of switch 9 and relay 20, and, through contact members a of transfer relay 13, to line conductor L2.

Closure of contact members b of transfer relay 13 completes the circuits for the actuating coils of transfer relays 15 and 17. These circuits extend from line conductor L1, through conductor 28, in series through the contact members b of switches 5 and 1 and relay 13, to a junction point 36. From the junction point 36, one branch extends through the actuating coil of relay 15 to line conductor L2, and a second branch extends through the actuating coil of relay 17 to line conductor L2.

Closure of contact members c of transfer relay 13 completes the circuit for the actuating coil of field switch 8, associated with generator G2. This circuit extends from line conductor L1, through conductor 28, in series through the contact members b of switches 5 and 1, contact members c of relay 13, and through the actuating coil of field switch 8, to line conductor L2.

Upon actuation of switch 9, the contact members a thereof are closed. Closure of contact members a of switch 9 excludes a second portion of accelerating resistor R1 from the circuit of the winding Gf1, thereby causing the voltage of generator G1 to increase to the maximum value, and causing a proportionate increase in the speed of elevator car C.

Upon actuation of relay 20, the contact members a and b thereof are closed. Closure of contact members a of relay 20 completes a holding circuit for the coils of switch 9 and relay 20, which extends from line conductor L1, as previously traced through these coils, and thence to line conductor L2 through contact members a of relay 20. Following completion of this holding circuit, the circuits for the coils of switch 9 and relay 20 are independent of the position of transfer relay 13, and remain complete until the opening of contact members 2UL of inductor 2L, which occurs during the retarding operation.

Closure of contact members b of relay 20 completes the circuit for the retiring coils UL' and DL' of the stopping switches UL and DL, which circuit extends from line conductor L1 through conductor 37, contact members b of relay 20, and thence to line conductor L2 through the coils UL' and DL'. As previously described, in response to completion of this circuit, the switches UL and DL are retired to a position in which the rollers associated therewith are out of the path of the cooperating cams 1U and 1D, and in which the contact members associated therewith are closed. Closure of the contact members D of switch DL is without effect, but closure of contact members U of switch UL completes a holding circuit for the coils of switches 5, 1 and 3 which is independent of the contact members a of starting relay 1'. Accordingly, following completion of this holding circuit, the circuit for switches 5, 1 and 3 is independent of the position of car switch Cs, and remains complete until the opening of switch UL, which occurs in the course of the retarding operation.

Upon actuation of field switch 8, the contact members a thereof are closed, and the contact members b thereof are opened. Closure of contact members a of field switch 8 completes the circuit for the field winding Gf2 of generator G2, which circuit extends from line conductor L1 through conductor 28, contact members b of switch 5, contact members a of switch 1, field winding Gf2, the coil of a holding relay 16, contact members a of field switch 8, a portion of an accelerating resistor R2, the remainder of which is short circuited by the normally closed sets of contact members a—a', b—b', and c—c' of load-responsive switch LS, contact members b of accelerating switch 10 and thence, through contact members a of switch 3, to line conductor L2. Following completion of this circuit, the field of generator G2 rises to a value corresponding to an intermediate voltage of generator G2.

Opening of contact members b of field switch 8 interrupts the circuit of the demagnetizing winding GAf2 associated with generator G2, the function of which will be hereinafter more fully described in connection with the retarding operation.

Actuation of holding relay 16 causes the contact members a thereof to close. Closure of these contact members completes a branch circuit for the coil of transfer relay 13, the purpose of which will be explained in connection with the description of the retarding operation.

Upon actuation of transfer relay 17, the contact members thereof are opened. However, the opening of these contact members is without effect, since a branch circuit for the actuating coil of switch 11 extends through the normally closed contact members b of switch 12.

Upon actuation of transfer relay 15, the contact members a thereof are closed. Closure of contact members a of relay 15 completes the circuit for the actuating coil of transfer switch 12, which circuit extends from line conductor L1, through conductor 28, contact members b of switches 5 and 1 contact members a of relay 15, and through the coil of switch 12, to line conductor L2.

Upon actuation of transfer switch 12, the contact members a thereof are closed and the contact members b thereof are opened. Closure of contact members a of switch 12 initiates the transition from single to double-generator operation by connecting the armature of generator G2 in the circuit of the armature of motor M.

The opening of contact members b of transfer switch 12 interrupts the circuit for the actuating coils of transfer switch 11, to thereby cause completion of the transition. The interruption of this circuit causes the contact members a of transfer switch 11 to open and the contact members b thereof to close.

The opening of contact members a of transfer switch 11 removes the shunt circuit around the armature of generator G2. Closure of contact members b of switch 11 is without effect, since the circuit for the coil of transfer switch 12 is already complete through a branch including contact members a of transfer relay 15.

It will be observed that, during the accelerating operation, the opening of switch 11 is rendered subject to the previous closure of transfer switch 12, in the manner described above. As will be hereinafter more fully described, during the retarding operation, the opening of transfer switch 12 is rendered subject to the previous closure of transfer switch 11. Accordingly, the armature circuit of motor M is maintained complete throughout the transition from single to double-generator operation, and from double to single-generator operation.

In view of the fact that, during the interval that switches 11 and 12 are both closed, a local circuit of relatively low resistance is subjected to the voltage of generator G2, it is desirable that the voltage of generator G2 be maintained at a reasonably low value until the transfer has been completed. In the illustrated embodiment, field switch 8 operates to complete the circuit for winding Gf2 substantially simultaneously with the operation of switch 12 to initiate the transition from single to double-generator operation. In the practice of my invention, I have discovered that, because of the relatively slow response of the field winding G/2, the voltage of generator G2 does not rise to an objectionable value before the transition is complete.

It will be understood, however, that the switches 8, 11 and 12 may be caused to operate in any desired sequence. Accordingly, if, in certain embodiments of my invention, it is found that operation of switch 8 prior to operation of switches 12 and 11 is accompanied by an objectionable voltage across the terminals of generator G2 during the transition, the operation of switch 8 may be delayed through use of appropriate electrical interlocks, or by decreasing the ratio of resistance to inductance in the circuit of the coil of switch 8 to thereby obtain a greater inductive time delay in the closing thereof.

Following completion of the field circuit of generator G2, the voltage of this machine rises to an intermediate value, motor M is supplied with voltage of a value equal to the sum of the maximum voltage of generator G1 and an intermediate voltage of generator G2, and the speed of elevator car C is increased to a high intermediate value. This operating speed will be maintained as long as car switch Cs is maintained in the second operating position.

Assuming that it is desired to operate the elevator car C at maximum speed, car switch Cs may be moved to its extreme position in the counter-clockwise direction to cause completion of a circuit for the actuating coil of accelerating switch 18. This circuit extends from line conductor L1 through contact members 23, 24 and 38 of car switch Cs, the now closed contact members c of reversing switch 1, the normally closed contact members 4UL of inductor relay 4L, and, through the coil of switch 18 to line conductor L2.

Upon actuation of switch 18, the contact members a and b thereof are closed, and the contact members c thereof are opened. Closure of contact members a of switch 18 excludes a portion of the resistor R2 from the circuit of the separately excited field winding G/2, thereby increasing the excitation of this winding to a corresponding extent. Accordingly, the voltage of generator G2 rises to the maximum value thereof for a given load, and the speed of elevator car C is increased to the maximum value.

Closure of contact members b of switch 18 completes a holding circuit for switch 18 extending from line conductor L1 through conductor 39, the contact members b of switch 18 and thence to line conductor L2 as previously traced. Following completion of this holding circuit, the circuit for the coil of switch 18 is independent of the position of car switch Cs and remains complete until the opening of the contact members 4UL of inductor relay 4L, which occurs during the retarding operation.

The contact members c of switch 18 control an interlock in the circuit of the coil of inductor relay 3L, and the opening of these contact members is without effect during the accelerating operation.

As hereinbefore described, the positions of the several pairs of contact members of the current-responsive switch LS are determined in accordance with the magnitude and character of the load, the combined actions of the series field winding GSf1 and switch LS being effective to raise or lower the voltage of the motor-supply circuit sufficiently to maintain the speed of motor M at a predetermined value. Accordingly, as long as car switch Cs is maintained in the third operating position, motor M continues to drive car C upwardly at full speed.

Assuming that it is desired to bring the elevator car to rest, the car switch Cs may be returned to its neutral position at any time before inductor relay 4L is moved to a position opposite the cooperating inductor plate 4U associated with the selected floor landing.

Because of the previously traced holding circuits through the contact members c of switch 18, contact members b of switch 10 and contact members a of relay 20, the interruption of the circuits through contact members 38 and 32 of car switch Cs is without immediate effect. The interruption of the circuit through contact member 25 of car switch Cs, however, deenergizes the coil of starting relay 1', thereby causing this relay to open its contact members a, and to close its contact members b and c.

The opening of contact members a of relay 1' is without effect, since a holding circuit for the coils of switches 1, 3 and 5 extends through the now closed contact members of the up-direction stopping switch UL. Similarly, the closure of contact members c of relay 1' is without immediate effect, since the circuit for the coils of switches 2 and 4 is interrupted at the contact members f of switch 1.

Closure of contact members b of relay 1', however, completes a circuit for the coil of inductor relay 4L, which circuit extends from line conductor L1 through conductor 40, the coil of relay 4L, and in series through the now closed contact members b of relays 1', 2' and 19, to line conductor L2. As hereinbefore described, the energization of the coil 4L does not immediately affect the position of the contact members 4UL. When inductor relay 4L is brought opposite cooperating inductor plate 4U, the contact members 4UL are actuated to their open positions, to thereby interrupt the circuit for the coil of switch 18.

Upon deenergization of the coil of switch 18, the contact members a and b thereof are opened, and the contact members c thereof are closed. The opening of contact members a of high-speed switch 18 reinserts a portion of resistor R2 in the circuit of the field winding Gf2 of generator G2, thereby reducing the voltage of this machine to an intermediate value. In response to the reduction of voltage of generator G2, the elevator motor M retards to the high-intermediate speed thereof.

The opening of contact members b of switch 18 is without effect, but closure of contact members c thereof completes a circuit for the coil of inductor relay 3L. This circuit extends from line conductor L1 through conductor 41, the coil of relay 3L, the now closed contact members c of switch 18, and thence to line conductor L2, as traced for the coil of relay 4L. Accordingly, when relay 3L is moved to a position opposite inductor plate 3U, the contact members 3UL are actuated to the open position to interrupt the circuits for the coils of switch 10 and relay 14. The interruption of these circuits causes the reduction of the voltage of generator G1, interrupts the field circuit of generator G2, and initiates an automatic sequence which results in a transition from double to single-generator operation. The switching operations involved are as follows:

Deenergization of the coil of relay 14 causes the contact members a thereof to open, and the contact members b thereof to close. Closure of contact members b of relay 14 completes a circuit for the coil of inductor relay 2L by way of conductor 42. The opening of contact members a of relay 14 is without effect, since a branch circuit for the coil of transfer relay 13 now extends through contact members a of holding relay 16.

Upon deenergization of the coil thereof, switch 10 is returned to the initial position, and the contact members a, b and c thereof are opened. The opening of contact members a reinserts a portion of the resistor R1 in the circuit of the field winding Gf1 of generator G1. Accordingly, the voltage of this machine is reduced, and motor M is correspondingly retarded. The opening of contact members c of switch 10 is without effect.

The opening of contact members b of accelerating switch 10 interrupts the circuit of the field winding Gf2 of generator G2. Accordingly, the energy stored in the winding Gf2 starts to discharge through the circuit including winding Gf2, the coil of holding relay 16, contact members a of field switch 8 and discharge resistor R4, the rate of discharge being determined, of course, in accordance with the ratio of the inductance to the resistance of this circuit. As the field flux of generator G2 decreases, the voltage of this machine is correspondingly reduced. Accordingly, motor M is further retarded.

As hereinbefore described, because of the low-resistance local circuit, including the armature of generator G2 and conductors 44 and 45, which exists during the transition from single to double-generator operation, and also during the transition from double to single-generator operation, it is desirable that the transfer operation be delayed until the voltage of generator G2 has fallen to a suitably low value.

In the practice of my invention, I have found that satisfactory operation may be attained by employing suitable time-element devices to delay the initiation of the transfer from double to single operation for a predetermined interval after the interrupton of the field circuit of generator G2. However, a preferred arrangement comprises the use of switching mechanism responsive to an electrical condition of the generator which is proportional to the voltage thereof.

In the illustrated embodiment of my invention, since all of the field excitation of generator G2 is derived from the winding Gf2, the current in this circuit is always proportional to the voltage of generator G2. Accordingly, I employ the holding relay 16, the coil of which is in series with the winding Gf2, to initiate the transition from double to single-generator operation.

When the current in the discharge circuit for winding Gf2 has dropped to a suitably low value, holding relay 16 is released to its initial position, and the contact members a thereof are opened. The opening of contact members a of holding relay 16 deenergizes the actuating coil of transfer relay 13. Deenergization of the coil of transfer relay 13 causes the contact members a, b and c thereof to open. The opening of contact members a of transfer relay 13 is without immediate effect, since a holding circuit for the coils of switch 9 and relay 20 extends through the now closed contact members a of relay 20. The opening of contact members b and c of transfer relay 13 deenergizes the coils of transfer relays 15 and 17, and field switch 8.

Deenergization of the coil of field switch 8 causes the contact members a thereof to open and the contact members b thereof to close. The opening of contact members a of field switch 8 is substantially without effect, since the current in the associated circuit is already of a very low value. Closure of contact members b of switch 8 completes the circuit for the demagnetizing winding GA/2 of generator G2. The demagnetizing winding GA/2 is connected directly across the armature of generator G2, in series with a resistor R6, and is wound to impress a magnetomotive force on the field structure of generator G2 in opposition to the residual magnetism of that machine. Accordingly, upon completion of the circuit for winding GA/2, the voltage of generator G2 is reduced substantially to zero.

Deenergization of the coil of transfer relay 15 is without immediate effect, since a branch circuit for the actuating coil of transfer switch 12 extends through the now closed contact members b of transfer switch 11. Deenergization of the coil of transfer relay 17, however, causes the contact members thereof to close and complete the initial energizing circuit for the actuating coil of transfer switch 11. As previously described, this circuit extends from line conductor L1 through conductor 22, the coil of switch 11, and, through the contact members of relay 17, to line conductor L2.

Upon actuation of transfer switch 11, the contact members a thereof are closed, and the contact members b thereof are opened. Closure of contact members a of transfer switch 11 completes the previously described shunt circuit around the armature of generator G2. The opening of contact members b of transfer switch 11 deenergizes the coil of transfer switch 12.

Upon deenergization of the actuating coil of transfer switch 12, the contact members a thereof are opened, and the contact members b thereof are closed. Closure of contact members b of transfer switch 12 is without effect, since the circuit for the actuating coil of transfer switch 11 is already complete through a branch circuit, including the contact members of relay 17. Opening of contact members a of field switch 12, however, completes the transition from double to single-generator operation by interrupting the armature circuit of generator G2. Accordingly, throughout the remainder of the retarding operation, motor M is supplied entirely by generator G1.

It is to be observed that, during the retarding operation, transfer switch 11 is closed prior to the opening of transfer switch 12, in order that the armature circuit of motor M may be maintained complete throughout the transition. It will be recalled that, during the accelerating operation, the same requirement involved the closure of transfer switch 12 prior to the opening of transfer switch 11. In the illustrated embodiment of my invention, the alternative sequence of operation of switches 11 and 12 is accomplished through use of the additional transfer relays 15 and 17.

As elevator car C continues toward the selected floor landing, inductor relay 2L is moved to a position opposite inductor plate 2U, at which time the contact members 2UL are actuated to the open position, to thereby interrupt the circuit for the coils of switch 9 and leveling relay 20.

Deenergization of the coil of switch 9 causes the contact members a thereof to open to reinsert a portion of the resistor R1 in the circuit of the field winding G/1. Accordingly, the voltage of generator G1 falls to the minimum value, and the speed of motor M is reduced to what may be termed the "landing speed".

The interruption of the circuit for the coil of leveling relay 20 causes the contact members b of this relay to open and deenergize the retiring coils UL' and DL' of the stopping switches UL and DL.

Upon deenergization of the retiring coils UL' and DL', the leveling switches are extended into the paths of the mechanical cams 1U and 1D, located adjacent to the selected floor landing. At the time the coil of relay 20 is deenergized, the roller associated with leveling switch UL is opposite the raised surface of the cam 1U. Accordingly, deenergization of the retiring coil UL' is without immediate effect, since the switch UL is now maintained closed through the cooperation of the roller and cam. Switch DL controls only the down reversing circuits and the opening of this switch is, consequently, without effect.

When the elevator car C reaches a position substantially level with the landing, the roller of the arm associated with switch UL passes off the surface of the cam 1U, thereby permitting switch UL to open and interrupt the circuit for the coils of switches 1, 3 and 5.

The opening of switches 1, 3 and 5 interrupts the circuits for the field winding G/1, the break-release magnet Br', control relay 19 and field switch 6.

The opening of contact members a of field switch 6 is without effect, but closure of contact members b thereof completes the circuit for the demagnetizing winding GA/1, which functions to reduce the voltage of generator G1 to zero, in the manner described in connection with the winding GA/2 associated with generator G2. The opening of control relay 19 deenergizes the coils of all of the inductor relays. The interruption of the circuit for the release magnet Br permits the brake to engage the drum B and bring the elevator car to rest. The opening of switch 5 also interrupts the circuit between the hoisting motor and the generator G1.

In the majority of cases, provided the generator G1 is suitably compounded, as hereinbefore described, the regulation of the system will be such that car C will be stopped accurately level with the floor landing. In freight installations, however, or even in passenger installations for relatively high buildings, the hoisting cables may stretch or contract, as the car is being loaded or unloaded, to such an extent as to cause an appreciable movement of the elevator car. To overcome this effect, I have arranged the stopping switches UL and DL to perform the additional function of maintaining the car level with the landing, or of returning the car to a position level with the landing in the event that the initial stoppage is not sufficiently accurate.

Assuming, therefore, either that car C passed slightly beyond the floor landing, in the course of the initial stopping action, or has moved to a position above the landing because a heavy load has been removed from the car, the following operations take place.

With the car slightly above the floor landing, the roller associated with down-direction-switch DL is opposite the raised surface of the cooperating cam 1D, and the contact members D of this switch are, therefore, closed. Closure of switch DL completes a circuit for switches 2, 4 and 5, which extends from line conductor L1, through conductor 26, the coil of switches 5, 4, and 2 in series, the contact members of switch DL, the now closed contact members c of starting relay 1', to line conductor L2. In response to completion of this circuit, switches 5, 4 and 2 close to release the brake and energize relay 19 and switch 6 in precisely the manner described with respect to the closure of switches 1, 3 and 5. As hereinbefore described, completion of these circuits connects the armature of motor M to the armature of generator G1, and connects the field winding Gf1 for minimum excitation to thereby cause the elevator car C to travel at landing speed. In this case, however, it should be noted that switches 2 and 4 reverse the direction of current flow through the winding Gf1, thereby causing generator G1 to supply motor M with voltage of proper polarity to cause the car to move downwardly.

When the car reaches a position accurately level with the landing, switch DL is released to the open position, to thereby interrupt the circuit for switches 5, 4 and 2 and bring the car to rest as described above. Similarly, if the car "creeps" to a position slightly below a floor landing, switch UL is closed to complete a circuit for switches 5, 1 and 3 to cause the elevator car to move upwardly at slow speed.

Referring now to the second modification of the above-described arrangement, if switch 43 is moved to the closed position, the control of the circuits for transfer relays 15 and 17 and transfer switches 11 and 12 is transferred from holding relay 16 to switches 5 and 1.

In accordance with this arrangement, whereas the field circuit of generator G2 is interrupted, and the demagnetizing field circuit of generator G2 is completed, in the manner hereinbefore described, the armature of generator G2 is not excluded from the circuit of the armature of motor M until after the operation of switch UL or DL to bring the system to rest. The accelerating operation and the leveling operations are not affected by the closure of switch 43.

With switch 43 closed, assuming that the retarding operation has progressed to the stage at which inductor relay 3L is actuated to interrupt the circuit for field switch 10 and transfer relay 14, field switch 10 functions, as previously described, to interrupt the field circuit for generator G2 and to reduce the excitation of generator G1. Similarly, as previously described, when the current in the circuit of winding Gf2 has decreased to a predetermined low value, holding relay 16 is released to interrupt the circuit for transfer relay 13, the contact members a, b and c of which are accordingly opened.

The opening of contact members c of transfer relay 13 interrupts the circuit for field switch 8 in the manner described. The opening of field switch 8 causes completion of the circuit for the demagnetizing field winding GAf2 of generator G2, which functions, as described, to reduce the voltage of generator G2 to substantially zero.

With switch 43 closed, however, the opening of contact members b of transfer relay 13 is without effect, since a branch circuit for transfer relays 15 and 17 extends through contact members b of transfer relay 15 and through switch 43. Accordingly, transfer switch 12 remains closed, and transfer switch 11 remains open until the above-described holding circuit is interrupted at the contact members b of switches 5 and 1, which occurs in response to the opening of stopping switch UL or DL.

If car C is initially brought to rest at a point other than level with the selected landing, either switch UL or switch DL is actuated, to the closed position to thereby complete, in the manner described, appropriate reversing and low-speed circuits to cause motor M to move car C to a position accurately level with the landing. Since switches UL and DL do not control the circuit for transfer relay 13, transfer switch 11 remains closed and transfer switch 12 remains open, all of the energy for the leveling operation being derived from the relatively low-voltage generator G1.

Since operation of elevator car C in the downward direction is in all respects similar to operation thereof in the upward direction, it is unnecessary to describe such operation in detail. It will be noted that, to effect downward operation of car C, car switch Cs is moved in the clockwise direction instead in the counterclockwise direction, that reversing switches 2 and 4 and starting relay 2', replace reversing switches 1 and 3 and starting relay 1', and that the several operating circuits are interrupted at the inductor-relay contact members 4DL, 3DL and 2DL instead of at the contact members 4UL, 3UL and 2UL.

The hereinbefore described embodiments of my invention are merely illustrative, and I recognize that various modifications may be made without departing from the spirit and scope thereof. I desire, therefore, that only such limitations shall be imposed as are indicated in the appended claims.

I claim as my invention:

1. In a control system for a motor, a relatively high and a relatively low-voltage generator, circuit connections for connecting said motor and said generators in series to effect high-speed operation of said motor, field windings for said generators and a source of excitation therefor, and means to gradually retard the speed of said motor comprising means to reduce the excitation of said field windings, means to complete a shunt circuit around the armature of said high-voltage generator, means to interrupt the armature circuit of said high-voltage generator and means controlled in accordance with the voltage of said high-voltage generator for controlling the operation of said shunting and interrupting means.

2. In a motor control system, a motor, a plurality of generators, means for electrically connecting said motor to said generators, means for starting and accelerating said motor to a predetermined speed comprising means for exciting all of said generators, means for decelerating said motor to a low speed comprising means for removing the excitation from part of said generators, means for interrupting the electrical connections between said motor and said part of said generators, and means for delaying the operation of said interrupting means until the voltage of said part of said generators is of a low value.

3. In a motor control system, a motor, a plurality of generators, means for electrically connecting said motor to said generators, means for starting and accelerating said motor to a predetermined speed comprising means for exciting all of said generators, means for decelerating said motor to a low speed comprising means for removing the excitation from part of said generators, means for interrupting the electrical connections between said motor and said part of said generators, and means for controlling said interrupting means in accordance with an electrical condition of said part of said generators.

4. In a motor control system, a motor having an armature, a plurality of generators each having an armature, means for connecting the armatures of said generators in series in a circuit including the armature of said motor, means for operating said motor at a predetermined speed comprising means for exciting all of said generators, sequentially operable means for stopping said motor comprising means for removing the excitation from certain of said generators, means for excluding said certain of said generators from the circuit of said motor, and means for removing the excitation from the remainder of said generators, and means for delaying the operation of said excluding means until the voltage of said certain of said generators is of a low value.

5. In a motor control system for an elevator car operable in a hatchway past a floor, a motor for driving said car, a plurality of generators, means for electrically connecting said motor to said generators, means for operating said car at a predetermined speed comprising means for exciting all of said generators, and means operable in accordance with the position of said car with respect to said floor for decelerating said car comprising means for reducing the excitation of certain of said generators, and means for interrupting the electrical connections between said motor and said certain of said generators.

6. In a motor control system for an elevator car operable in a hatchway past a floor, a motor for driving said car, a plurality of generators, means for electrically connecting said motor to said generators, means for operating said car at a predetermined speed comprising means for exciting all of said generators, and sequentially operable means rendered effective when said elevator passes a predetermined point in advance of said floor for stopping said elevator, said stopping means comprising means for reducing the excitation of certain of said generators, means for interrupting the electrical connections between said motor and said certain of said generators, and means for removing the excitation from the remainder of said generators.

7. In a control system for an elevator car operable past a floor, a motor for driving said car, a plurality of generators, means for starting said car comprising means for exciting certain of said generators, means for accelerating said car to a predetermined speed comprising means for electrically connecting said motor to the remainder of said generators and for exciting said remainder of said generators, and means sequentially operable in accordance with the position of said car with respect to said floor for stopping said car at said floor, said stopping means comprising means for reducing the excitation of said remainder of said generators, means for interrupting the electrical connections between said motor and said remainder of said generators, and means for removing the excitation from said certain of said generators.

8. In a control system for an elevator car operable past a floor, a motor for driving said car, a plurality of generators, means for electrically connecting said motor and said generators, means for operating said car at a plurality of speeds comprising means for causing the excitation of certain of said generators to provide a relatively low speed of said motor, and for causing the excitation of all of said generators to provide a relatively high operating speed of said motor, and additional means, comprising leveling mechanism disposed for operation in accordance with the position of said car with respect to said floor, for causing the excitation of said certain of said generators.

9. In a control system for an elevator car operable past a floor, a motor for driving said car, a plurality of generators, means for operating said car at a relatively high speed comprising means for causing connection of said motor in a series circuit including all of said generators and for causing the excitation of all of said generators, and means for operating said motor at a relatively low speed to effect a leveling movement of said car comprising means operable in accordance with the position of said car with respect to said floor for causing connection of said motor in a circuit including only a part of said generators and for causing the excitation of said part of said generators.

10. In a control system for an elevator car operable past a floor, a motor for driving said car, a plurality of generators, means for operating said elevator at a relatively high speed comprising means for causing completion of electrical connections between said motor and all of said generators and for causing the excitation of all of said generators, means sequentially operable in accordance with the position of said car with respect to said floor for stopping said car at said floor comprising means for reducing the excitation of part of said generators, means for interrupting the electrical connections between said motor and said part of said generators, and means for removing the excitation from the remainder of said generators, and circuit connections whereby said last named means are also effective to cause completion of electrical connections between said motor and said remainder of said generators and for causing the excitation of said remainder of said generators to thereby effect a leveling movement of said car.

11. In a control system for an elevator car operable past a floor, a motor for driving said car, a plurality of generators, means for operating said elevator at a relatively high speed comprising means for causing completion of electrical connections between said motor and all of said generators and for causing the excitation of all of said generators, means sequentially operable in accordance with the position of said car with respect to said floor for stopping said car at said floor comprising means for reducing the excitation of part of said generators, means for interrupting the electrical connections between said motor and said part of said generators, and means for removing the excitation from the remainder of said generators, and additional means, operable in accordance with the position of said car with respect to said floor and effective, in the event said car overruns said floor, to cause completion of electrical connections between said motor and said remainder of said generators and for causing the excitation of said remainder of said generators to thereby cause said car to return to said floor.

12. The combination with an electric motor of high and low voltage generators having their armatures connected in a circuit in series with each other and the armature of said motor, a normally open switch in said circuit adjacent said high voltage generator, a shunt circuit around said switch and said high voltage generator, a normally closed switch in said shunt circuit, separately excited field windings for said generators, and means for controlling the excitation of said field windings so as to first energize the field winding of the low voltage generator to start the motor, and thereafter close said normally open switch, open said normally closed switch, and then energize the field winding of said high voltage generator to increase the speed of said motor.

13. The combination with an electric motor, of high and low voltage generators connected in series with each other and with said motor, separately excited field windings for said generators, a normally closed circuit shunting said high voltage generator, and a control device movable from a given position progressively to a plurality of operative positions to first energize the field winding of said low voltage generator to start said motor, then open said shunt circuit, and then energize the field winding of the high voltage generator to increase the speed of said motor.

14. The combination with an electric motor, of relatively high and low voltage generators, separately excited field windings for said generators, a normally closed shunt circuit connecting the armature of said low voltage generator with the armature of said motor, electromagnetically operated switching means for controlling the circuits of said field windings for forward and reverse operation of said motor, electromagnetically operated switching means for opening said shunt circuit and for closing a circuit for said motor through the armature of said high voltage generator and a master control device movable in one of two directions to progressively operate said switches to energize the field winding of said low voltage generator to start said motor in the desired direction, then open said shunt circuit and close the circuit for said high voltage generator, and then energize the field winding of said high voltage generator to increase the speed of said motor.

15. In a control system for a motor, a relatively high and a relatively low-voltage generator, circuit connections for connecting said motor and said generators in series to effect high-speed operation of said motor, field windings for said generators and a source of excitation therefor, a controller and means responsive to operation of the controller for gradually retarding the speed of said motor to first reduce the excitation of the high voltage generator, then close a circuit in shunt to the armature of said high voltage generator, then disconnect the armature of the high voltage generator from the motor circuit, and then reduce the excitation of the low voltage generator.

FRANK E. LEWIS.